UNITED STATES PATENT OFFICE 2,130,087

METHOD OF PRODUCING SOY BEAN FLAKES

Frank F. Hasbrouck, Peoria, Ill., assignor to Allied Mills, Inc., Chicago, Ill., a corporation of Illinois No Drawing. Application September 19, 1936, Serial No. 101,585

2 Claims. (Cl. 99—98)

My invention relates to food products and a method for producing them. It has special reference to food products resulting from the treatment of soy beans.

One object of my invention is to prepare from soy beans a product of the breakfast food type in flake form and of substantially reduced fat content with respect to the original soy beans.

Another object of my invention is to provide a process for the economical and efficient manufacture of such a product as referred to above.

Flaked cereal products have been prepared in the past from cereal grits, such as corn grits, and from whole grains of relatively low fat content, such as rice or wheat. Efforts have been made to prepare similar type products from soy beans by cooking them and thereafter flaking the cooked mass, as well as by utilizing them in a mixture with other grains, but so far as I am aware, none of these methods of treating soy beans has been commercially successful.

I have discovered, however, that I can prepare from soy bean material a flake food product having a desirably low fat and high protein content similar to that of soy bean oil meal, such as is prepared by removing the oil from soy beans by any one of the well known processes, such as the expeller, hydraulic, or solvent extraction methods. Such meal ordinarily will have a fat content of from one to nine per cent and a protein content of from 40 to 69 per cent. However, it differs from the materials normally used in the manufacture of flaked foods, in that the original botanical structure of the seed has been broken down by crushing or grinding, and instead of being one integral structure, it consists of a large number of fine particles which may be in coherent form as the result of the pressure applied in the hydraulic or expeller process, or may be brought into coherent form by pressure of existing discrete particles resulting from solvent extraction, preferably with the use of a binding agent which may be water or any suitable adhesive substance.

However, the degree of coherence between the individual particles that make up the cake is not such as to render this cake a satisfactory raw material for the manufacture of flaked food by the processes known and used heretofore for this purpose, since those processes involve steps such as would result in destroying the slight degree of coherence which holds the soy meal particles together in the form of a cake.

I have found, however, that by grinding and carefully sizing the cake and then subjecting it to a tempering process in which the relations of the factors time, amount of moisture, and size of grits are held within certain specific ranges which I have determined, I can produce excellent soy bean flaked food using the defatted cake as raw material.

The main features of my new process for making flakes from soy bean grits prepared from soy bean hydraulic, expeller, or other cake are as follows:

I

The grits are not cooked at all. They are only tempered in a tempering bin where the proper amount of moisture, seasoning, and flavoring material is mixed in with the grits, which are then left to temper for a suitable length of time, which may be between two and twenty-four hours.

II

The moisture content of the tempered grits is closely controlled. If the grits are too wet they will not flake but tend to be shredded, and if they are too dry there is too much tendency for the grits to be ground rather than to be flaked when put through the flaking rolls. I have found that the best moisture content is from 25 to 28 per cent, and that outside the limits of 20 to 35 per cent moisture in the grits the latter will not flake properly.

III

I have found it preferable to use grits of sizes such as will just pass through screens of square mesh ranging from $\frac{1}{8}''$ to $\frac{3}{8}''$, although I can successfully utilize in my process grits of somewhat larger or smaller size.

IV

While conveying the tempered grits to the flaking rolls, the treatment must be sufficiently gentle so as to avoid disintegration of the moistened grit which is rather fragile.

The following is an illustrative example for carrying out my invention:

Four hundred pounds of soy bean grits of a size which passes through a screen of $\frac{1}{4}''$ square mesh are prepared by grinding and sizing expeller or other soy bean cake and mixed with 16 gallons of water to which has been added eight pounds of salt. The mixture is mixed in a cylinder and conveyed to a tempering bin where it is tempered for two to four hours or longer. The tempered grits are then passed through a pair of flaking rolls set so as to reduce their thickness to an average of between 0.01'' and 0.03''. The flaked material is passed through one or a series of toasting ovens, and finally the fine material is removed from the toasted flakes in a purifier.

A batch of flakes processed according to the method of the above example showed by analysis a composition as follows:

|  | Per cent |
| --- | --- |
| Moisture | 3 |
| Crude protein | 48 |
| Crude fat | 5 |
| Crude fiber | 2 |
| Ash | 5 |
| Nitrogen free extract | 37 |
| Total | 100 |

The foregoing example should be construed only as illustrative and not by way of limitation, since many modifications may be effected by those skilled in the art without departing from the spirit and scope of my invention, such, for instance, as the addition of further seasoning or flavoring ingredients, other food components, etc.

I, therefore, particularly point out and distinctly claim as my invention:

1. The process of converting substantially defatted soy bean cake into a palatable food product in toasted flake form which comprises the steps of reducing the cake to grits of predetermined size and consisting of adhering individual small particles, developing plasticity in said grits by the addition thereto of only enough moisture so that they will contain from 20% to 35% of water by weight and storing them to permit the water to become evenly diffused therein, flattening the thus plasticized grits to form flakes therefrom, and toasting the resulting flakes to dry them, to reduce their plasticity, and to develop a desirable crispness and flavor therein.

2. The process as defined in claim 1, in which the cake is expeller cake, the size of the grits is from 1/8" to 1/4", and the moisture from 25% to 28% by weight.

FRANK F. HASBROUCK.